United States Patent [19]

Mills et al.

[11] 4,345,613

[45] * Aug. 24, 1982

[54] PRESSURE-OPERATED PORTABLE SIPHON APPARATUS FOR REMOVING CONCENTRATIONS OF LIQUID FROM A GAS PIPELINE

[75] Inventors: Walter C. Mills, San Angelo, Tex.; James W. Patterson, Hobbs, N. Mex.

[73] Assignee: InterNorth, Inc., Omaha, Nebr.

[*] Notice: The portion of the term of this patent subsequent to Aug. 11, 1998, has been disclaimed.

[21] Appl. No.: 264,592

[22] Filed: May 18, 1981

Related U.S. Application Data

[63] Continuation-in-part of Ser. No. 40,712, May 21, 1979, Pat. No. 4,282,894, which is a continuation-in-part of Ser. No. 832,673, Sep. 12, 1977, Pat. No. 4,155,372.

[51] Int. Cl.$^3$ ............... F16K 51/00; F17D 3/10; F04F 10/00
[52] U.S. Cl. .................. 137/317; 137/318; 137/152
[58] Field of Search .................. 137/1, 15, 123, 145, 137/148, 152, 317, 318; 138/37; 141/65; 251/62, 63, 63.6; 417/307, 310

[56] References Cited

U.S. PATENT DOCUMENTS

| | | | |
|---|---|---|---|
| 1,181,910 | 5/1916 | McGilvray | 137/317 |
| 1,191,013 | 7/1916 | McGilvray | 137/323 |
| 1,955,325 | 4/1934 | Young | 137/145 |
| 2,073,311 | 3/1937 | May | 137/318 |
| 2,918,085 | 12/1959 | Govan et al. | 251/62 |
| 3,270,677 | 9/1966 | Eller et al. | 138/37 |
| 3,307,574 | 3/1967 | Anderson | 251/62 |
| 3,948,283 | 4/1976 | Asfura | 137/152 |
| 3,949,963 | 4/1976 | Aoki | 251/63.6 |

Primary Examiner—George L. Walton
Attorney, Agent, or Firm—Zarley, McKee, Thomte, Voorhees & Sease

[57] ABSTRACT

An apparatus for removing concentrations of liquid from a natural gas pipeline comprising a tap valve mounted on the pipeline at the upper portion thereof so as to be in communication with the interior of the pipeline. A siphon apparatus is removably mounted on the tap valve and includes a siphon pipe which is vertically movably mounted with respect to the tap valve. The siphon pipe is vertically movable from an upper position wherein the lower end of the siphon pipe is positioned above the tap valve to a lower position wherein the siphon pipe extends through the tap valve so that the lower end of the siphon pipe is positioned at the bottom interior of the pipeline. A discharge pipe extends from the siphon pipe and is in communication with a liquid holding tank. A siphon valve is imposed in the discharge pipe to permit the selective removal of the liquid from the pipeline. A portion of the siphon pipe is enclosed by an operating cylinder barrel. A piston is positioned on the siphon tube and sealably engages the interior of the operating cylinder barrel. The upper and lower ends of the operating cylinder barrel are in communication with a source of pressure so that the siphon pipe may be raised or lowered by means of the pressure. The source of pressure may be either an auxiliary pressure source such as nitrogen, $CO_2$ or compressed air. The source of pressure for raising and lowering the siphon pipe may also comprise a hydraulic pump assembly including a safety bypass. The upper and lower ends of the operating cylinder barrel are also in communication with the atmosphere through valves to permit the venting of the operating cylinder barrel as desired.

3 Claims, 7 Drawing Figures

PRESSURE-OPERATED PORTABLE SIPHON APPARATUS FOR REMOVING CONCENTRATIONS OF LIQUID FROM A GAS PIPELINE

CROSS-REFERENCE TO RELATED APPLICATION

This is a continuation-in-part application of Ser. No. 40,712 filed May 21, 1979, now U.S. Pat. No. 4,282,894, which was a continuation-in-part application of Ser. No. 832,673 filed Sept. 12, 1977 and which issued as U.S. Pat. No. 4,155,372 on May 22, 1979.

BACKGROUND OF THE INVENTION

This invention relates to a portable siphon apparatus which may be used to remove concentrations of liquid from a natural gas pipeline.

A problem encountered in the transportation of natural gas through gathering and carrier pipelines is that liquid tends to concentrate in the "low spots" or sags in the pipeline. Collection of liquids in gathering system pipelines has always been a problem. In recent years it has become progressively worse since greater production demands and declining reservoir pressure have caused the producing formations to yield water at an ever-increasing rate. Liquid removal equipment at well heads may not exist, or if it does, it may become overloaded or fail to operate properly. Liquids are carried into the pipeline system where it condenses and separates from the natural gas stream and collects in the low places between hills, at stream undercrossings, or where the pipeline is buried deep in order to cross highways or railroads.

Liquid concentrations in gathering systems seriously restrict the flow of gases and cause back pressures to be built against the feeding wells with consequent loss of well production. Liquid concentrations affect gathering compressors thereby causing waste of fuel and horsepower. Liquids moving through gas compressors cause excessive wear thereby increasing down time and maintenance cost. During winter months when production is ordinarily most needed, the pipeline may freeze off completely and production from an entire subsystem may be lost. Such pipeline freezes are extremely difficult to locate and clear and usually happen at a time when weather and work conditions are less than desirable.

In the past, to clear a section of pipeline of liquid, blowdowns on either end of a section were opened and the line was blown long and hard to the atmosphere. Large volumes of gas were wasted in addition to salt water and petroleum liquids being blown onto the land.

Many of the problems connected with the removal of liquid from natural gas pipelines was solved by the apparatus disclosed in Ser. No. 832,673, now U.S. Pat. No. 4,155,372. The invention disclosed in Ser. No. 40,712, now U.S Pat. No. 4,282,894, represented a significant improvement over the earlier device in that the apparatus disclosed therein eliminated the use of hand-operated feed screw. In Ser. No. 40,712, now U.S. Pat. No. 4,282,894, an auxiliary source of pressure for raising and lowering the siphon pipe was disclosed and the instant invention represents further advances over that earlier disclosed.

Therefore, it is a principal object of the invention to provide an improved apparatus for removing liquids from natural gas pipelines.

A still further object of the invention is to provide a portable siphon apparatus which may be used in combination with valves mounted at low spots or sags in the pipeline to remove liquids from the pipeline.

A still further object of the invention is to provide a portable siphon apparatus for removing liquids from pipelines which does not require that the line be taken out of service.

A still further object of the invention is to provide a portable siphon apparatus which may be used to remove liquids from pipelines wherein the liquids are not blown into the atmosphere.

A still further object of the invention is to provide a portable siphon apparatus for removing liquids from natural gas pipelines without undesirable gas loss.

A still further object of the invention is to provide a pressure-operated portable siphon apparatus which may be used to remove liquids from pipelines.

A still further object of the invention is to provide a pressure-operated portable siphon apparatus which is extremely easy to use and which eliminates strain on the tap valves associated therewith.

A still further object of the invention is to provide a pressure-operated portable siphon apparatus including an auxiliary power source for raising and lowering the siphon apparatus to prevent comtamination of the siphon apparatus by the water, hydrocarbons, or other abrasive materials found within the pipeline.

A still further object of the invention is to provide a pressure-operated portable siphon apparatus including means for preventing damage to the siphon pipe.

SUMMARY OF THE INVENTION

Figure 1:
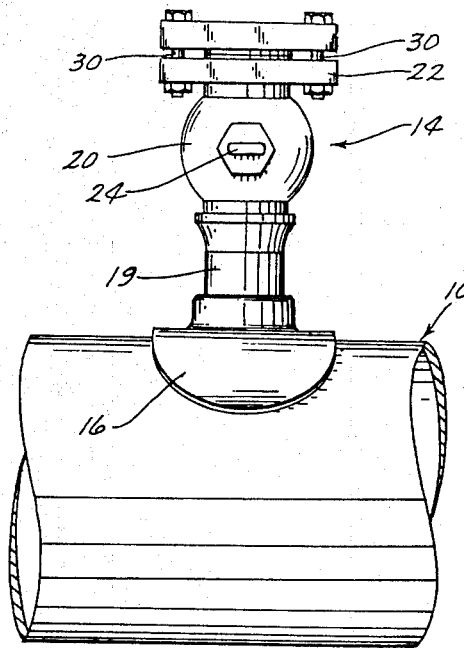
FIG. 1 is a side view of the pipeline and valve mounted thereon after the siphon apparatus has been removed therefrom.
Figure 2:
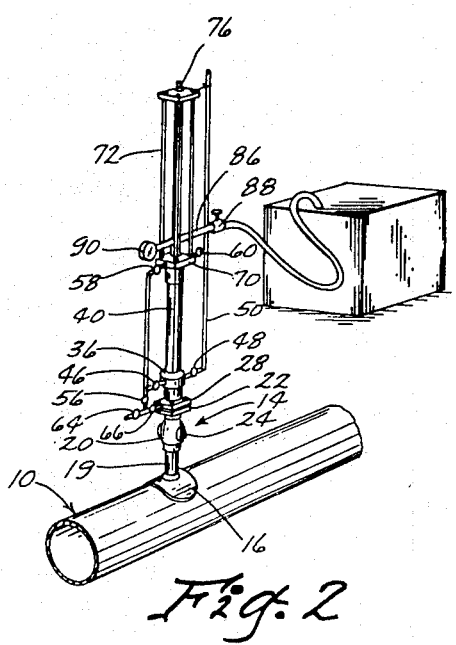
FIG. 2 is a perspective view of the apparatus of this invention installed on a pipeline.
Figure 3:
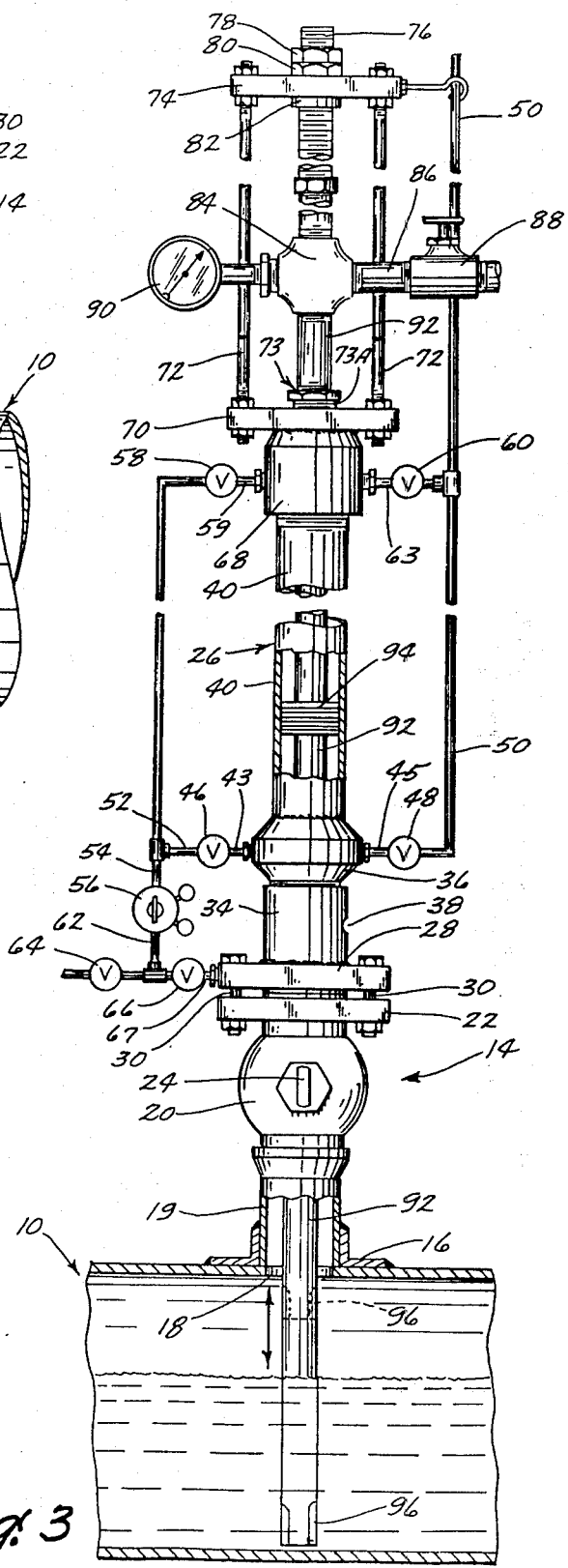
FIG. 3 is a sectional view similar to FIG. 2 except that the siphon pipe is illustrated in its lowered position.
Figure 4:
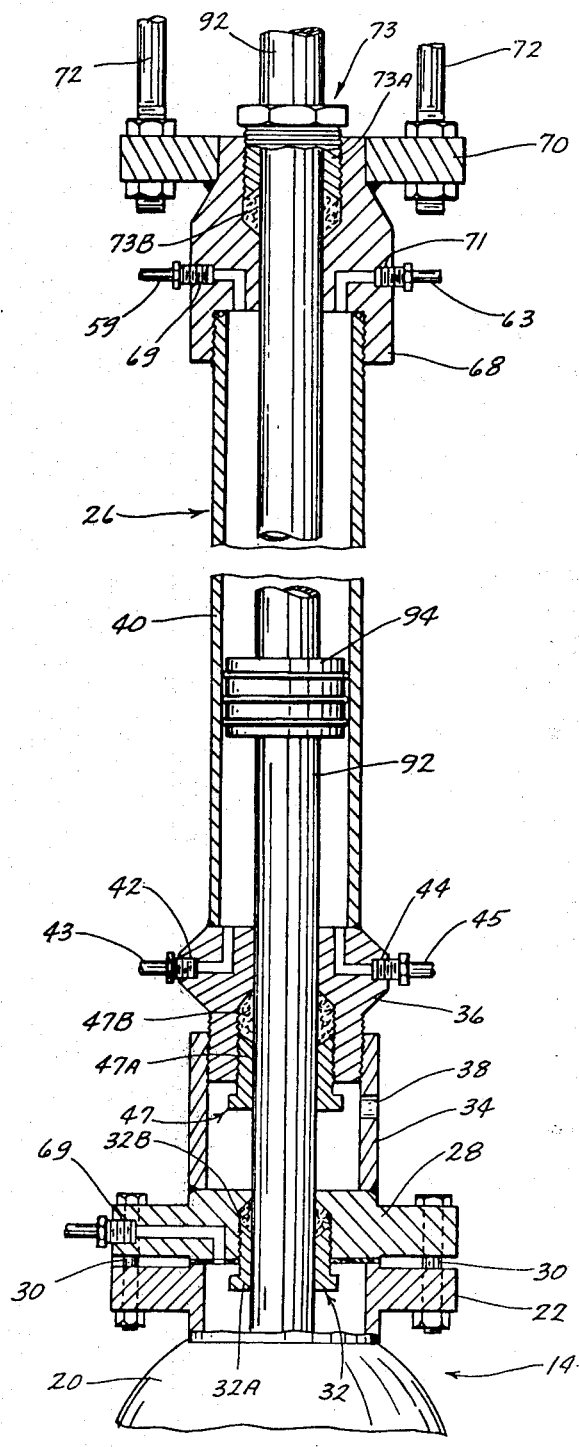
FIG. 4 is a sectional view as seen on lines 4—4 of FIG. 3.

A full opening tap valve is welded to the pipeline at each low spot or sag wherein concentrations of liquid occur. A pressure-operated portable siphon apparatus is removably secured to the upper end of the valve and includes a siphon pipe which is vertically movably mounted with respect to the valve. The siphon pipe is movable from a first position wherein the lower end thereof is positioned above the valve to a lower position wherein the siphon pipe extends downwardly through the valve so that the lower end thereof is in communication with the bottom interior of the pipeline. A discharge pipe extends from the upper end of the siphon pipe to a liquid holding tank so that the liquids removed from the pipeline will be discharged into the holding tank upon the opening of a siphon valve in the discharge pipe. A portion of the siphon pipe is vertically movably mounted in an operating cylinder barrel. A piston is secured to the siphon pipe within the operating cylinder barrel so that pressure introduced into the operating cylinder barrel on either side of the piston will cause the siphon pipe to be moved. An auxiliary pressure source such as pressurized gas or a hydraulic pump assembly is provided to supply pressure to either side of the piston on the siphon pipe for raising and lowering the siphon pipe. The hydraulic pump assembly includes a safety bypass to prevent the siphon pipe from damaging the pipeline. Means is also provided to vent the opposite ends of the operating cylinder barrel as required.

DESCRIPTION OF THE PREFERRED EMBODIMENT

The numeral 10 refers generally to a natural gas carrier pipeline having liquid 12 which tends to concentrate in the low spots or sags in the pipeline. The presence of the liquid 12 in the pipeline restricts the flow of natural gas through the pipeline. The liquid 12 will also freeze during cold temperatures which can completely freeze off the pipeline.

As stated, liquid inside a pipeline collects at low places. Pressure profiles taken during normal operating conditions will indicate the presence of liquid in the low places. The gas does not flow with sufficient velocity to carry the liquid over the top of hills or the like and must therefore pass through the liquid in the form of bubbles. After the pipeline has been excavated at the lowest point in a valley, the gas bubbles traveling through the liquid are audible and are detected with an electronic listening device such as a "Sonotec" instrument. At the lowest point in the valley, the pipeline is first excavated and a full-opening tap valve assembly 14 is installed on the pipeline in conventional fashion. As seen in the drawings, a reinforcing pad 16 is saddle welded to the pipeline so as to extend around the opening 18 which is formed in the pipeline 10 in conventional fashion using conventional tapping equipment. Nipple 19 is welded to pad 16 and extends upwardly therefrom. A full-opening tap valve 20 is welded to nipple 19 and is provided with a flange 22 at its upper end. The operation of the valve 20 is controlled by means of the stem portion 24 extending laterally therefrom. After the tap opening 18 has been formed in the pipe, the tap equipment is removed therefrom.

When it is desired to remove the liquid 12 from the pipeline 10, the siphon apparatus 26 is removably secured to the valve assembly 14 as will be described in more detail hereinafter.

Flange 28 is secured to flange 22 by means of bolts 30. Packing gland 32 is mounted in the flange 28 as illustrated in the drawings. Packing gland 32 includes a collar 32A which is threadably received by flange 28 and the graphite-type packing 32B. Lower receiver 34 is welded to the upper end of flange 28 and extends upwardly therefrom. Receiver 34 is provided with an internal threaded portion at its upper end which threadably receives a fitting 36. Receiver 34 is provided with a vent opening 38 intermediate the length thereof for a purpose to be described in more detail hereinafter.

The numeral 40 refers to a hollow operating cylinder barrel which is welded to the upper end of fitting 36 and which extends upwardly therefrom. As seen in the drawings, fitting 36 is provided with threaded ports 42 and 44 formed therein which are in communication with the lower end of the operating cylinder barrel 40. Lines 43 and 45 are connected to ports 42 and 44 respectively. Valves 46 and 48 are connected to the lines 43 and 45 respectively. Packing gland 47 is mounted in fitting 36 and comprises collar 47A and packing material 47B. Valve 48 has a vent line 50 extending therefrom which is in communication with the atmosphere above the upper end of the apparatus. Valve 46 has a line 52 extending therefrom which is in communication with line 54 extending from adjustable regulator 56. As seen in the drawings, line 54 is in communication with valve 58 which is in communication with line 59. As also seen in the drawings, line 60 is in communication with line 50 and is connected to valve 62 which has line 63 extending therefrom. Regulator 56 is provided with a line 62 extending therefrom which is in communication with valves 64 and 66. Valve 66 is in communication with the interior of the upper end of the tap valve 20 by means of line 67 being connected to port 69 so as to receive operating pressure from the pipeline. Valve 64 is in communication with a source of pressure from an auxiliary source such as an air compressor, nitrogen, carbon dioxide or a hand-operated liquid pressure pump as will be described in greater detail hereinafter.

The numeral 68 refers to an upper receiver which is threadably secured to the upper end of the barrel 40 and which has threaded ports 69 and 71 formed therein which are in communication with lines 59 and 63 respectively. Flange 70 is welded to the upper end of the receiver 68 and is provided with a packing gland 73 comprised of collar 73A and packing material 73B. A plurality of tie rods 72 are secured to the flange 70 and extend upwardly therefrom. A stop and guide flange 74 is secured to the upper ends of the tie rods 72 and has the stop and guide shaft 76 movably extending therethrough. Adjustable locking stop nuts 78 and 80 are threadably mounted on the upper end of the shaft 76 and are adapted to limit the downward movement of the shaft 76 and the siphon pipe as will be described in more detail hereinafter. A bronze wear busing 82 is also provided in the flange 74. Fitting 84 is secured to the lower end of shaft 76 and has pipe 86 extending therefrom which is in communication with a liquid outlet valve 88. The numeral 90 refers to a pressure gauge which is in communication with the interior of the fitting 84 so that the pressure in the carrier pipeline may be ascertained. Siphon pipe 92 is threadably secured to the fitting 84 and extends through the packing gland 73 in the flange 70. Pipe 92 is provided with a piston 74 secured thereto intermediate the ends thereof which is in sealable sliding engagement with the interior wall surface of the barrel 40. The lower end of the siphon pipe 92 is provided with cut-away portions 96 to allow the liquid to enter the interior thereof.

Figure 5:
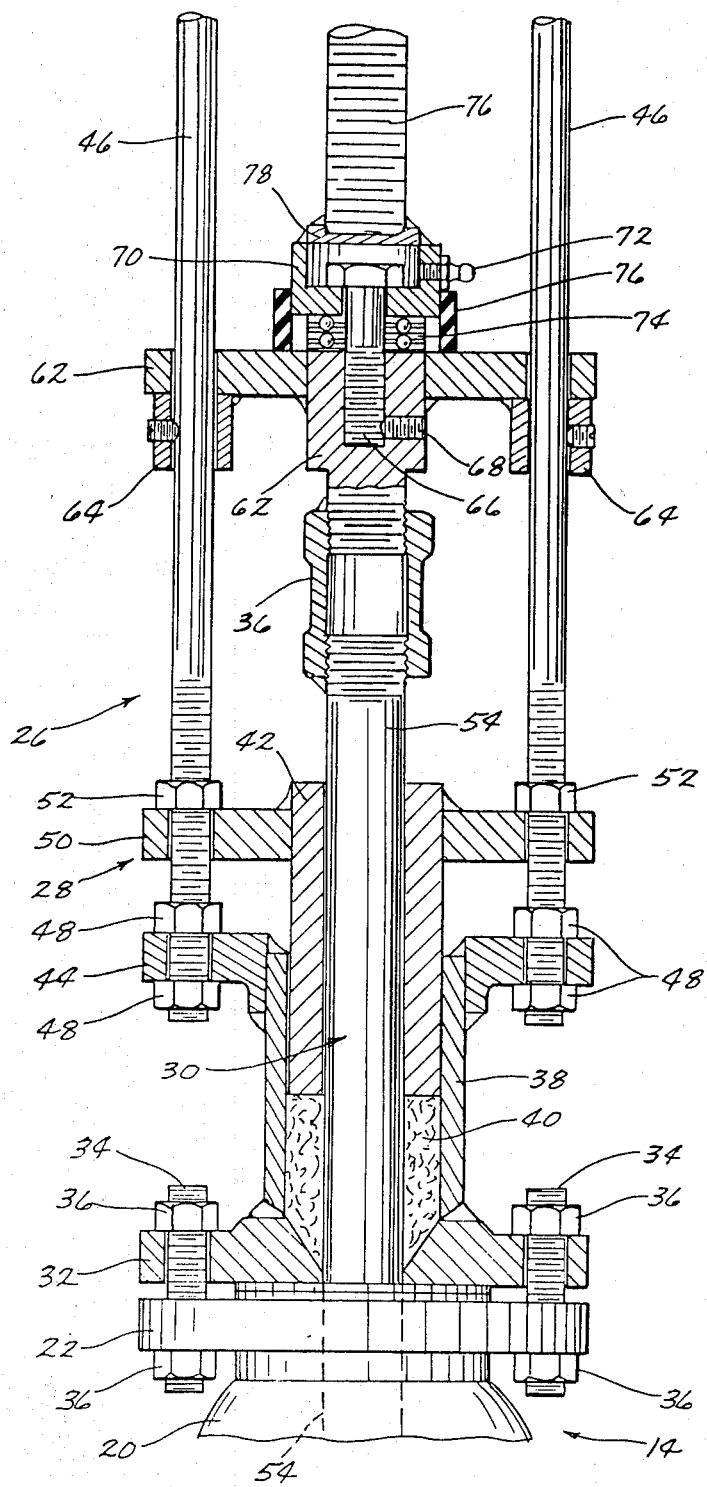
FIG. 5 is a sectional view illustrating the upper portion of the siphon apparatus.

FIG. 5 illustrates the valve 64 being connected to a source of auxiliary pressure generally indicated at 100. The auxiliary pressure source 100 may be operatively connected to the valve 64 by any means. Preferably, the auxiliary pressure source is selected from the group consisting of nitrogen, $CO_2$ or compressed air.

Figure 6:
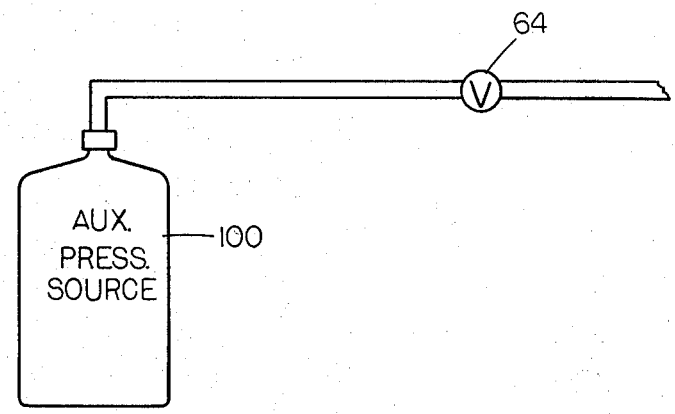
FIG. 6 is a schematic view illustrating an auxiliary pressure source being employed to raise and lower the siphon pipe.

FIG. 6 illustrates a further means for supplying auxiliary pressure to the valve 64. The numeral 102 refers to a hydraulic pump which may be either operated by the motor 104 or by a hand or foot operated lever. Hydraulic pump 102 is connected to a safety bypass valve 106 by line 108. Valve 106 is connected to valve 64 by line 110. Valve 106 is also connected to the hydraulic reservoir 112 by line 114. Reservoir 112 is connected to the hydraulic pump 102 by line 116.

In operation, the tap valve assembly 14 is preferably mounted on the pipeline 10 at each sag or low spot in the pipeline. The valve 20 is normally closed until it is desired to remove the liquid from the pipeline 10. The flange closing the upper end of the valve 20 is then removed and the siphon apparatus of this invention is mounted thereon by means of the bolts 30. Prior to mounting the siphon apparatus on the valve assembly 14, the siphon pipe 92 would normally be in its uppermost position relative to the barrel 40. After the apparatus has been installed on the tap valve assembly in its fully retracted position with all of the operating valves closed, and with the adjustable stop nuts 78 and 80 being properly adjusted to prevent the siphon pipe from touching the interior bottom of the carrier pipeline 10, the tap valve 20 is fully opened. Operating pressure to the apparatus is then introduced into the interior of the barrel 40 at the upper end thereof by means of valve 64 or valve 66 depending on the source of operating pressure. If an auxiliary pressure source is to be employed rather than the pressure within the pipeline, valve 64 would be opened to supply pressure to the valve 56. If the pressure within the pipeline is to be utilized, valve 66 would be opened with valve 64 closed. The operating pressure is observed with the pressure gauge at the adjustable regulator 56. It should be noted that all of the siphon pipe operating valves are of the positive, slow-acting needle valve type for positive, safe operation.

To lower the siphon pipe to the limit of the pre-set stop nuts 78 and 80, operating pressure is introduced into the upper end of the barrel 40 as previously described by means of the valve 58. When sufficient pressure is reached in the upper end of the barrel 40, the siphon pipe and piston will move downwardly with respect to the barrel 40. The travel speed of the siphon pipe is easily controlled by adjusting the rate of flow through valve 58. If liquid and a hand-operated pressure pump is being used for operating pressure, valve 58 should be fully opened which will allow the siphon pipe travel to be regulated with the hand-operated pressure pump.

As the siphon pipe 92 and piston thereon move downwardly in the barrel 40, the volume in the lower end of the barrel 40 is compressed. When the force of compression in the lower end of the barrel 40, combined with the force of the pressure inside the pipeline on the siphon pipe become equal to the force of operating pressure in the upper portion of the barrel 40, the piston and siphon pipe will stop. At this point valve 58 may be fully opened. Compression in the lower portion of the barrel 40 must then be slowly vented through the vent valve 48 to complete the downward travel of the piston and siphon pipe. When the adjustable stop nuts 78 and 80 come into contact with flange 74, vent valve 48 may be fully opened.

The siphoning of liquid from the carrier pipeline is then accomplished by means of the valve 88. The pipeline pressure may be observed with the gauge 90. After the removal of the liquid from the pipeline is completed, valves 58 and 88 are closed. The upper vent valve 62 is then slowly opened. If the pipeline pressure exerting force on the siphon pipe is great enough to overcome packing and piston ring friction, the siphon pipe will retract or move upwardly to its upper limit position without additional pressure being exerted in the lower end of the barrel 40. However, if the pressure in the pipeline is not sufficient to raise the siphon pipe, the lower vent valve 48 should be closed and pressure slowly introduced into the lower end of the barrel 40 through the valve 46.

Vent opening 38 is provided to vent the space between packing glands 32 and 47 to prevent any contamination by gas or liquids entering the power cylinder and piston area.

Figure 7:
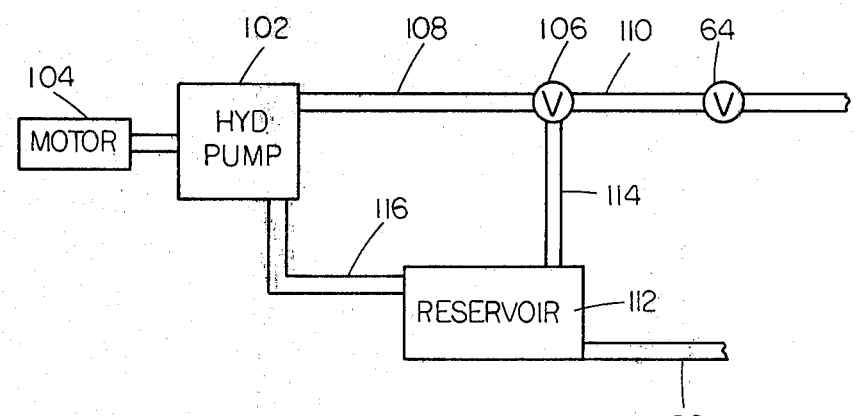
FIG. 7 is a schematic view illustrating a hydraulic pump assembly being utilized as the auxiliary pressure source.

If it is desired to utilize the auxiliary pressure source to avoid contamination of the interior of the siphon apparatus, either the auxiliary pressure source 100 or the hydraulic pump assembly should be connected to the valve 64. Either the auxiliary pressure source 100 or the hydraulic pump assembly seen in FIG. 6 eliminates contamination of the interior components of the apparatus. When auxiliary pressure source 100 is employed, the pressure within the source 100 is supplied to the valve 64 which supplies the necessary operating pressure to either side of the piston to raise and lower the siphon pipe. If a hydraulic pump assembly such as that illustrated in FIG. 7 is employed, the hydraulic pump 102 would be activated by either the motor 104 or by a hand-operated mechanism. Hydraulic fluid from the pump 102 is supplied to the safety bypass valve 106 which in turn supplies the hydraulic fluid under pressure to the valve 64. The safety bypass valve 106 is previously adjusted so that the hydraulic fluid being supplied thereto by the pump 102 will be recirculated or bypassed to the reservoir 112 when a predetermined pressure is sensed by the valve 106. The safety relief valve 106 is designed to prevent the siphon pipe from damaging the pipeline. Thus, when the siphon pipe is lowered into the pipeline and comes into contact with the bottom of the pipe, continued supply of hydraulic pressure to the valve 64 will be prevented since the valve 106 will relieve the pressure to the reservoir 112 to prevent the lower end of the siphon pipe from damaging the pipeline. As seen in FIG. 7, the vent line 50 is connected to the reservoir 112 when the hydraulic pump assembly is employed to return the hydraulic fluid to the system.

Thus it can be seen that a novel pressure-operated portable siphon has been provided which permits the removal of liquid from a pipeline without the necessity of taking the line out of production. The tool is much easier to operate than the tool of the earliest application since this tool does not require that a feed screw be rotated as on the earliest device. The fact that an auxiliary pressure source is employed to raise and lower the siphon pipe eliminates contamination of the interior components of the assembly. Further, the utilization of an auxiliary power source is much safer than utilization of the gas pressure from within the pipeline. Thus it can be seen that the invention accomplishes at least all of its stated objectives.

We claim:

1. In combination with a natural gas carrier pipeline having concentrations of liquid therein, comprising,
   a first valve means mounted on the pipeline at the upper portion thereof and being in communication with the interior thereof,
   a hollow support means being removably secured to said first valve means and extending upwardly therefrom; a hollow siphon pipe vertically movably mounted in said hollow support means and completely enclosed therein, said siphon pipe being movable from an upper position, wherein the lower end thereof is disposed above said first valve means, to a lower position wherein said siphon pipe extends through said first valve means with the lower end of said siphon pipe being positioned in said pipeline, a piston means on said siphon pipe in said hollow support means, a source of operating pressure in communication with the interior of said hollow support means above said piston means and with the interior of said hollow support means below said piston means, first control valve means for selectively supplying said operating pressure to said hollow support means above said piston means whereby said siphon pipe and said piston means will be moved downwardly in said hollow support means towards the said lower position, second control valve means for selectively supplying said operating pressure to said hollow support means below said piston means whereby said siphon pipe and said piston means will be moved upwardly in said hollow support means towards the said upper position above said first valve means, and a second valve means mounted on said support means and being operatively fluidly connected to the interior of said siphon pipe above said first valve means for permitting the selective removal of the liquid in said pipeline by the gas pressure within the pipeline, upwardly through said siphon pipe when said siphon pipe is in its said lower position, said source of operating pressure comprising a source of pressure selected from the group consisting of nitrogen, $CO_2$ and compressed air.

2. In combination with a natural gas carrier pipeline having concentrations of liquid therein, comprising, a first valve means mounted on the pipeline at the upper portion thereof and being in communication with the interior thereof, a hollow support means being removably secured to said first valve means and extending upwardly therefrom; a hollow siphon pipe vertically movably mounted in said hollow support means and completely enclosed therein, said siphon pipe being movable from an upper position, wherein the lower end thereof is disposed above said first valve means, to a lower position wherein said siphon pipe extends through said first valve means with the lower end of said siphon pipe being positioned in said pipeline, a piston means on said siphon pipe in said hollow support means, a source of operating pressure in communication with the interior of said hollow support means above said piston means and with the interior of said hollow support means below said piston means, first control valve means for selectively supplying said operating pressure to said hollow support means above said piston means whereby said siphon pipe and said piston means will be moved downwardly in said hollow support means towards the said lower position, second control valve means for selectively supplying said operating pressure to said hollow support means below said piston means whereby said siphon pipe and said piston means will be moved upwardly in said hollow support means towards the said upper position above said first valve means, and a second valve means mounted on said support means and being operatively fluidly connected to the interior of said siphon pipe above said first valve means for permitting the selective removal of the liquid in said pipeline by the gas pressure within the pipeline, upwardly through said siphon pipe when said siphon pipe is in its said lower position, said source of operating pressure comprising a hydraulic pump assembly.

3. The combination of claim 2 wherein said hydraulic pump assembly includes a safety bypass means to prevent damage to the siphon pipe and pipeline.

* * * * *